(12) United States Patent
Hachisuka et al.

(10) Patent No.: US 10,757,380 B2
(45) Date of Patent: Aug. 25, 2020

(54) DISPLAY CONTROL DEVICE, DISPLAY CONTROL METHOD, DISPLAY DEVICE, AND MOBILE DEVICE TO CONTROL DISPLAY OF MEDIA CONTENT IN A MOBILE OBJECT

(71) Applicant: SONY CORPORATION, Tokyo (JP)

(72) Inventors: Takumi Hachisuka, Tokyo (JP); Hiroshi Uji, Tokyo (JP); Kenichi Matsuhisa, Chiba (JP); Sho Tanaka, Tokyo (JP); Kazuma Yoshii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/301,644

(22) PCT Filed: Apr. 28, 2017

(86) PCT No.: PCT/JP2017/017067
§ 371 (c)(1),
(2) Date: Nov. 14, 2018

(87) PCT Pub. No.: WO2017/208718
PCT Pub. Date: Dec. 7, 2017

(65) Prior Publication Data
US 2019/0289264 A1    Sep. 19, 2019

(30) Foreign Application Priority Data

Jun. 2, 2016 (JP) ................................. 2016-110933

(51) Int. Cl.
*H04N 5/445* (2011.01)
*H04N 9/31* (2006.01)
(Continued)

(52) U.S. Cl.
CPC .......... *H04N 9/3147* (2013.01); *B60R 11/00* (2013.01); *B60R 16/00* (2013.01); *G01C 21/00* (2013.01);
(Continued)

(58) Field of Classification Search
CPC ....... H04N 5/2628; H04N 5/268; H04N 5/272
See application file for complete search history.

(56) References Cited

U.S. PATENT DOCUMENTS

| | | | |
|---|---|---|---|
| 2005/0044500 A1* | 2/2005 | Orimoto | H04M 1/72544 715/706 |
| 2008/0242271 A1* | 10/2008 | Schmidt | H04W 4/029 455/414.1 |

(Continued)

FOREIGN PATENT DOCUMENTS

| | | |
|---|---|---|
| CN | 101589620 A | 11/2009 |
| EP | 2007146 A2 | 12/2008 |

(Continued)

OTHER PUBLICATIONS

International Search Report and Written Opinion of PCT Application No. PCT/JP2017/017067, dated Jul. 25, 2017, 02 pages of translation and 11 pages of ISRWO.

*Primary Examiner* — Gigi L Dubasky
(74) *Attorney, Agent, or Firm* — Chip Law Group

(57) ABSTRACT

To automatically select a video of a location matching a hobby or a taste of a passenger, and display the video in a vehicle interior. A display control device includes: an acquisition unit configured to acquire passenger information of a mobile object; a specification unit configured to specify a location suitable for a hobby or a taste of a passenger on the basis of the passenger information; and a control unit configured to control a video displayed in the mobile object on the basis of the specified location. For example, the acquisition unit acquires at least one of an image accumu- (Continued)

lated in the information terminal or history information of processing executed by the information terminal, as the passenger information, and the specification unit specifies the location on the basis of an analysis result of the image or the history information.

19 Claims, 7 Drawing Sheets

(51) Int. Cl.
| | |
|---|---|
| G01C 21/34 | (2006.01) |
| G01C 21/36 | (2006.01) |
| G06K 9/00 | (2006.01) |
| H04N 5/262 | (2006.01) |
| H04N 5/268 | (2006.01) |
| H04N 5/272 | (2006.01) |
| B60R 11/00 | (2006.01) |
| H04N 5/74 | (2006.01) |
| H04N 21/00 | (2011.01) |
| G01C 21/00 | (2006.01) |
| B60R 16/00 | (2006.01) |
| H04N 5/66 | (2006.01) |
| G09G 5/00 | (2006.01) |
| G06T 7/246 | (2017.01) |
| G06T 7/13 | (2017.01) |
| H04N 21/414 | (2011.01) |

(52) U.S. Cl.
CPC ..... *G01C 21/3484* (2013.01); *G01C 21/3647* (2013.01); *G06K 9/00744* (2013.01); *G09G 5/00* (2013.01); *H04N 5/268* (2013.01); *H04N 5/2628* (2013.01); *H04N 5/272* (2013.01); *H04N 5/66* (2013.01); *H04N 5/74* (2013.01); *H04N 21/00* (2013.01); *G06T 7/13* (2017.01); *G06T 7/246* (2017.01); *G06T 2207/10016* (2013.01); *H04N 21/41422* (2013.01)

(56) References Cited

U.S. PATENT DOCUMENTS

| | | | |
|---|---|---|---|
| 2009/0175593 A1* | 7/2009 | Hayakawa | H04N 5/44543 386/248 |
| 2011/0196711 A1* | 8/2011 | Craig | G01C 21/3697 705/5 |
| 2012/0075530 A1 | 3/2012 | Miyazaki et al. | |
| 2012/0101722 A1 | 4/2012 | Inami et al. | |
| 2013/0050199 A1* | 2/2013 | Chavez | G06Q 10/101 345/419 |
| 2015/0170431 A1* | 6/2015 | Shimura | G08G 1/0112 701/31.5 |
| 2016/0156575 A1* | 6/2016 | Jeong | H04L 51/10 709/206 |
| 2016/0259412 A1* | 9/2016 | Flint | G06F 3/0488 |
| 2019/0026132 A1* | 1/2019 | King | G06F 3/0487 |

FOREIGN PATENT DOCUMENTS

| | | |
|---|---|---|
| JP | 2003-207346 A | 7/2003 |
| JP | 2007-233937 A | 9/2007 |
| JP | 2007-279800 A | 10/2007 |
| JP | 2011-007701 A | 1/2011 |
| JP | 2012-073350 A | 4/2012 |
| JP | 2013-063747 A | 4/2013 |
| WO | 2008/129879 A1 | 10/2008 |
| WO | 2010/150892 A | 12/2010 |
| WO | 2014/006688 A1 | 1/2014 |

* cited by examiner

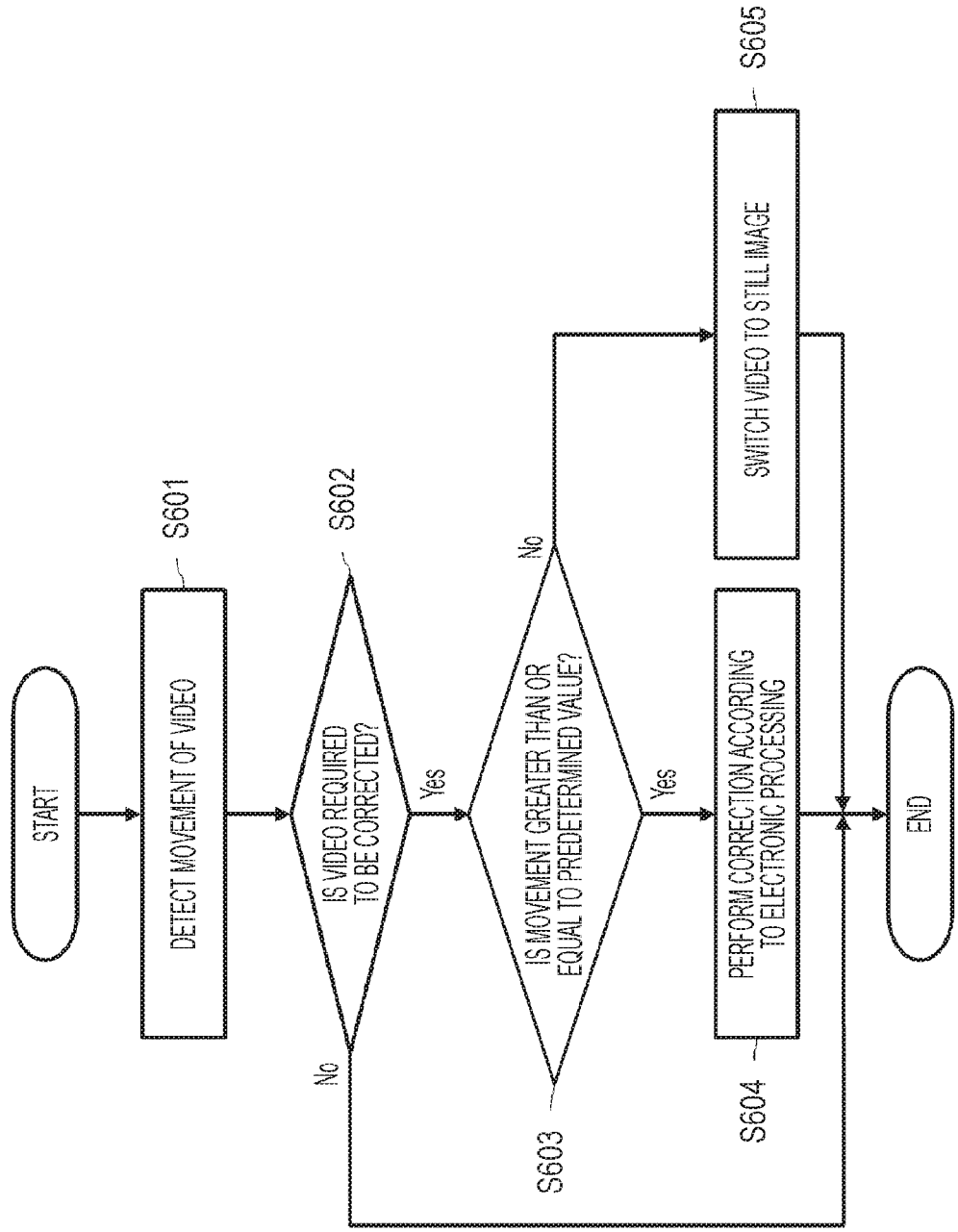

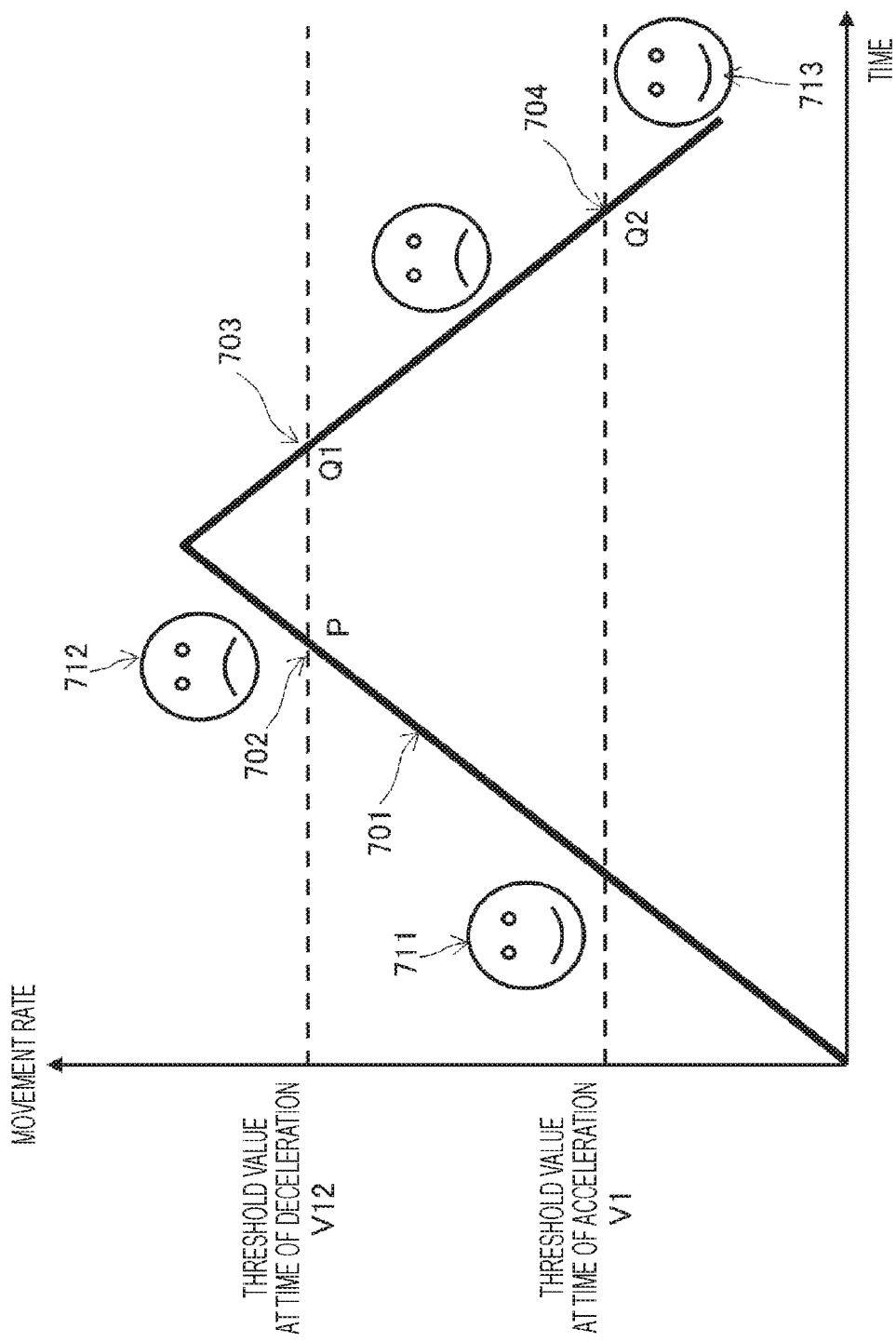

DISPLAY CONTROL DEVICE, DISPLAY CONTROL METHOD, DISPLAY DEVICE, AND MOBILE DEVICE TO CONTROL DISPLAY OF MEDIA CONTENT IN A MOBILE OBJECT

CROSS REFERENCE TO RELATED APPLICATIONS

This application is a U.S. National Phase of International Patent Application No. PCT/JP2017/017067 filed on Apr. 28, 2017, which claims priority benefit of Japanese Patent Application No. JP 2016-110933 filed in the Japan Patent Office on Jun. 2, 2016. Each of the above-referenced applications is hereby incorporated herein by reference in its entirety.

TECHNICAL FIELD

A technology disclosed herein relates to a display control device and a display control method display device, and a mobile device, in which display of a video in an enclosed space is controlled, and in particular, relates to a display control device and a display control method, a display device, and a mobile device, in which display of a video in a room of a mobile object such as a vehicle is controlled.

BACKGROUND ART

Studies for automated driving of a vehicle have rapidly progressed (for example, refer to Patent Document 1). It is assumed that a fully automated driving vehicle will appear in the public road in the near future, according to further spread of a future advanced safety driving system (ADAS), social-infrastructure improvements such as introduction of a dedicated driving lane or a lane section in which it is not necessary for a driver to intervene, and further, relaxation of a legal restraint such as allowing the driver to be isolated from vehicle control, and the like.

For a passenger of a vehicle, fully isolated from the vehicle control, a vehicle interior is a space for food, clothing, and housing, as a living room at home. It is assumed that the passenger reads a book, manipulates an information terminal such as a smart phone, appreciates contents such as a movie, on a display provided in the vehicle interior, or has a conversation or a meeting with another passenger, with little consciousness of being in the car.

Watching a video in the vehicle interior is already performed. It is general that watching a video in the vehicle interior is performed by using an on-board display or a head-up display. For example, a vehicle-mounted image display device has been proposed in which image information of a scenery to be seen in the outside of the vehicle in the position of the vehicle is acquired from an accumulation device, and is displayed on window glass (for example, refer to Patent Document 2). In addition, a vehicle-mounted image display device has been proposed in which image data indicating a surrounding image of the vehicle is generated on the basis of a detection result of a surrounding situation of the vehicle (an aspect such as a surrounding scenery, surrounding people, other vehicles, or an obstacle), or a driving state of the vehicle, and is displayed on display means provided on at least the entire front window portion of the vehicle (for example, refer to Patent Document 3).

CITATION LIST

Patent Document

Patent Document 1: Japanese Patent Application Laid-Open No. 2015-24746
Patent Document 2: Japanese Patent Application Laid-Open No. 2004-20223
Patent Document 3: Japanese Patent Application Laid-Open No. 2011-181110

SUMMARY OF THE INVENTION

Problems to be Solved by the Invention

An object of the technology disclosed herein is to provide a display control device and a display control method, a display device, and a mobile device, in which a video is displayed in a room of a mobile object such as a vehicle.

Solutions to Problems

A technology disclosed in the present specification has been made in consideration of the above object, and a first aspect of the technology lies in
a display control device, including:
an acquisition unit configured to acquire passenger information of a mobile object;
a specification unit configured to specify a location suitable for a hobby or a taste of a passenger on the basis of the passenger information; and
a control unit configured to control a video displayed in the mobile object on the basis of the specified location.

According to a second aspect of the technology disclosed in the present specification, in the display control device according to the first aspect, the acquisition unit acquires the passenger information from an information terminal used by the passenger.

According to a third aspect of the technology disclosed in the present specification, in the display control device according to the second aspect, the acquisition unit acquires at least one of an image accumulated in the information terminal or history information of processing executed by the information terminal, as the passenger information, and the specification unit specifies the location on the basis of an analysis result of the image or the history information.

According to a fourth aspect of the technology disclosed in the present specification, in the display control device according to the second aspect, the acquisition unit acquires history information that the passenger is moved by the mobile object, and the specification unit specifies the location on the basis of the history information.

According to a fifth aspect of the technology disclosed in the present specification, in the display control device according to the first aspect, the control unit displays a video of the location in the mobile object.

According to a sixth aspect of the technology disclosed in the present specification, in the display control device according to the first aspect, the control unit displays a live-action video including a live video or an archive video of the location, in the mobile object.

According to a seventh aspect of the technology disclosed in the present specification, in the display control device according to the first aspect, the control unit displays a CG video in which the location is reproduced, in the mobile object.

According to an eighth aspect of the technology disclosed in the present specification, in the display control device according to the fifth aspect, the control unit controls display of a subject included in the video.

According to a ninth aspect of the technology disclosed in the present specification, in the display control device according to the eighth aspect, the control unit extracts the subject on the basis of a feature amount of a movement vector or an edge of the video.

According to a tenth aspect of the technology disclosed in the present specification, in the display control device according to the eighth aspect, the control unit controls the display of the subject on the basis of attribution information of the subject.

According to a eleventh aspect of the technology disclosed in the present specification, in the display control device according to the eight aspect, the control unit deletes the subject of which privacy is required to be protected, from the video, or performs predetermined image processing.

According to a twelfth aspect of the technology disclosed in the present specification, in the display control device according to the first aspect, the control unit controls display of the video according to a feature amount of the video.

According to a thirteenth aspect of the technology disclosed in the present specification, in the display control device according to the twelfth aspect, when a movement of the video is fast, the control unit displays a still image by replacing the video with the still image, or displays the video after performing stabilization processing of suppressing the movement.

According to a fourteenth aspect of the technology disclosed in the present specification, in the display control device according to the first aspect, the control unit further controls display of an agent image superimposed on the video.

According to a fifteenth aspect of the technology disclosed in the present specification, in the display control device according to the fourteenth aspect, the control unit controls the display of the agent according to a driving situation of the mobile object (a movement rate or an acceleration rate, a movement region, and movement history).

According to a sixteenth aspect of the technology disclosed in the present specification, in the display control device according to the fourteenth aspect, the control unit controls the display of the agent according to the passenger information (specified passenger information and the number of passengers).

According to a seventeenth aspect of the technology disclosed in the present specification, in the display control device according to the first aspect, the control unit further controls display of the video according to a driving situation of the mobile object (information of an outdoor environment, a climate (a temperature, humidity, weather, or the like), and a destination or a movement path).

Further, an eighteenth aspect of the technology disclosed in the present specification lies in
a display control method, including:
an acquisition step of acquiring passenger information of a mobile object;
a specification step of specifying a location suitable for a hobby or a taste of a passenger on the basis of the passenger information; and
a control step of controlling a video displayed in the mobile object on the basis of the specified location.

Further, a nineteenth aspect of the technology disclosed in the present specification lies in A display device, including:
a display unit configured to display a video in a mobile object;
an acquisition unit configured to acquire passenger information of the mobile object;
a specification unit configured to specify a location suitable for a hobby or a taste of a passenger on the basis of the passenger information; and
a control unit configured to control the video displayed by the display unit on the basis of the specified location.

Further, a twentieth aspect of the technology disclosed in the present specification lies in
a mobile device, including:
a mobile object;
a display unit configured to display a video in the mobile object;
an acquisition unit configured to acquire passenger information of the mobile object;
a specification unit configured to specify a location suitable for a hobby or a taste of a passenger on the basis of the passenger information; and
a control unit configured to control the video displayed by the display unit on the basis of the specified location.

Effects of the Invention

According to the technology disclosed herein, it is possible to provide a display control device and a display control method, a display device, and a mobile device, in which a video is displayed in a room of a mobile object such as a vehicle.

Furthermore, the effects described herein are merely an example, and the effects of the present invention are not limited thereto. In addition, the present invention may have additional effects, in addition to the effects described above.

Other objects, characteristics, or advantages of the technology disclosed herein will be apparent by the more detailed description, based on embodiments as described later or the attached drawings.

BRIEF DESCRIPTION OF DRAWINGS

FIG. 6 is a flowchart illustrating an example of movement correction processing.

FIG. 7 is a diagram illustrating an example of agent control having hysteresis characteristics.

MODE FOR CARRYING OUT THE INVENTION

Figure 1:
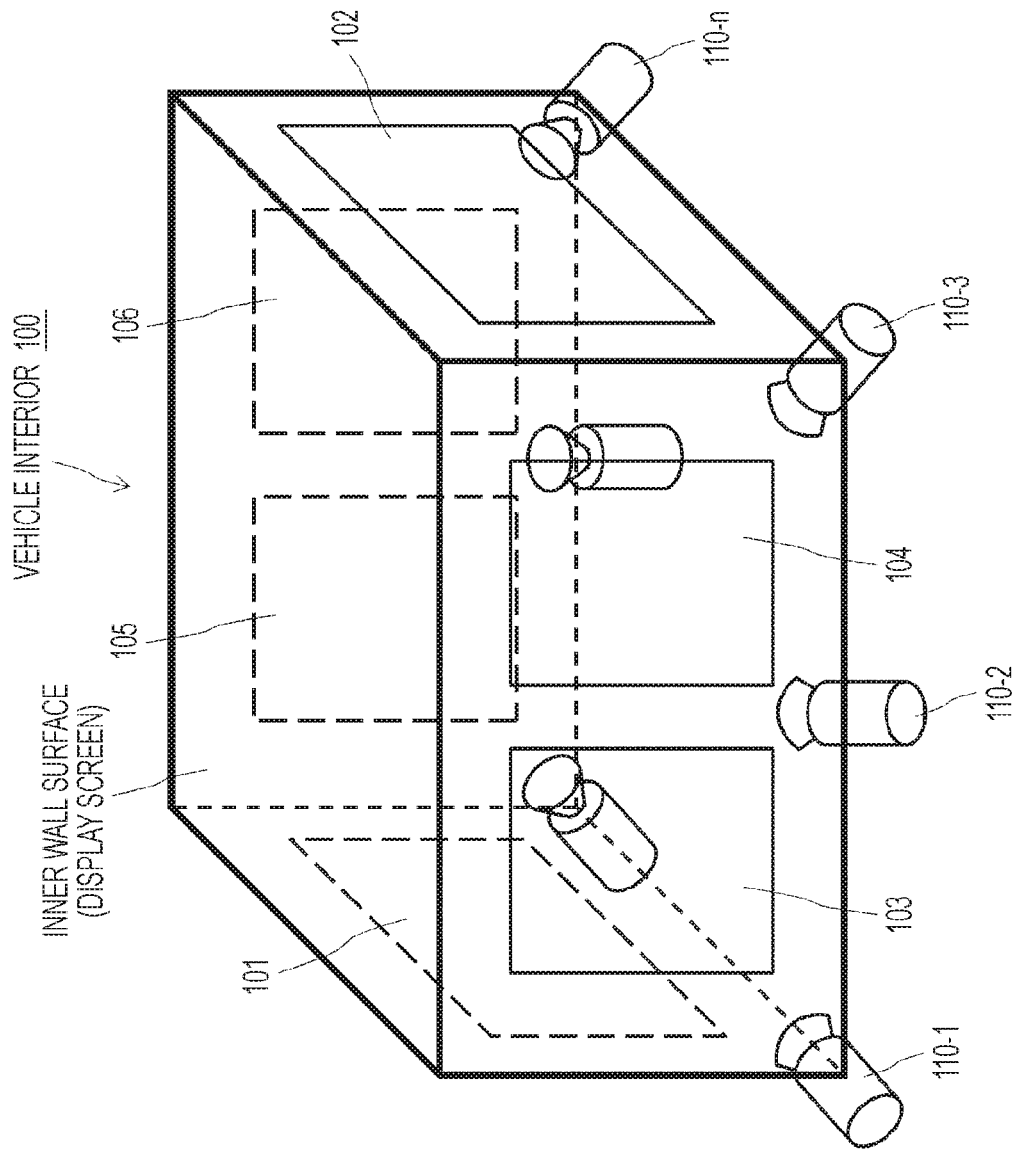
FIG. 1 is a diagram schematically illustrating a mechanism of using an inner wall surface of a vehicle interior as a celestial sphere display.

Hereinafter, an embodiment of the technology disclosed herein will be described in detail, with reference to the drawing.

Automated driving can be defined as a driving mode in which a vehicle is autonomously driven to a designated destination, while recognizing the surrounding environment of the vehicle by using a sensing device such as a radar, or light detection and ranging or laser imaging detection and ranging (LIDAR), a global navigation satellite system (GNSS, for example, global positioning system (GPS), or the like), and a vehicle-mounted camera. Here, in the following description, strict definition of the automated driving will not be considered. In addition, the automated driving may be performed by being limited to a dedicated driving lane or a lane section of an automated driving vehicle, set in an express highway or a public highway. In addition, in order to realize the automated driving of the vehicle, relaxation of a legal restraint relevant to the automobile driving is also required in addition to social-infrastructure improvements, and hereinafter, it will be described as if such problems are solved.

It is desirable that a vehicle interior be a space in which comfortable ride is provided for a driver released from a driving manipulation or the other passengers, and the driver or the other passengers can be relaxed, during a period in which the vehicle performs the automated driving. Obviously, even in a manual driving vehicle or a commercial car such as a taxi, it is also preferable that the vehicle interior is a space in which comfortable ride is provided for the passenger, and the passenger can be relaxed.

Herein, forming an inner wall surface of the vehicle interior as a celestial sphere display is proposed, as one of using methods of the automated driving vehicle. Obviously, the inner wall surface of the vehicle interior can be used for display, not only in the automated driving, but also in the manual driving or the commercial car, but in order for the driving manipulation of the driver, at least front glass is not capable of being used for display.

In FIG. 1, a mechanism of using the inner wall surface of the vehicle interior as the celestial sphere display is schematically illustrated. Here, in order to simplify the drawing, an inner wall surface of a vehicle interior 100 is illustrated as a rectangular parallelepiped.

In the vehicle interior 100, a plurality of projectors 110-1, 110-2, . . . , 110-N is disposed, and an image is projected from each of the projectors, and thus, a celestial sphere video is displayed on the inner wall surface of the vehicle interior 100. Here, it is not necessary to display a video of 360 degrees as the celestial sphere video herein, and a part of a viewing field may be omitted. In addition, the celestial sphere video may be a half celestial sphere video not including a floor surface with less information (the same applies to the following description).

The reason for using the plurality of projectors 110-1, 110-2, . . . , 110-N, is that it is not possible to display the video on the entire inner wall surface of the vehicle interior 100 by only one projector, it is possible to form the shadow of the passenger in the vehicle interior 100, and the like. In a case where it is possible to display the celestial sphere video on the inner wall surface of the vehicle interior 100 without generating a shadow, even in a case of not using all of the provided projectors 110-1, 110-2, . . . , 110-N, unnecessary projectors may be turned off. In a case where one video is displayed by the plurality of projectors, a joint portion between projection images of the adjacent projectors, is subjected to stitching processing to be matched.

Furthermore, a method for displaying the celestial sphere video on the inner wall surface of the vehicle interior 100, is not limited to a method using a projection type display as illustrated in FIG. 1. For example, a flat display such as a liquid crystal display (LCD) or a flexible display such as an organic electroluminescence (EL) display (OLED) may be pasted onto the inner wall surface of the vehicle interior 100, and thus, a whole-sky video may be displayed. In addition, even in a case of using any type of display of a projection type display, a flat type display, or a flexible type display, it is not limited to a configuration in which all of the inner wall surfaces of the vehicle interior 100 as illustrated in FIG. 1 are set to a screen, and for example, three surfaces excluding front glass, only the front glass, or only the ceiling may be set to the screen.

In an example illustrated in FIG. 1, a vehicle interior of a four-door ordinary passenger car is assumed, and the inner wall surface of the vehicle interior 100, includes front glass 101, a rear window 102, and side windows 103 to 106 for each seat (a driver seat, a passenger seat, and right and left backseats). Even though it is not illustrated, the vehicle may be provided with a sliding roof.

Such window glass (at least a part of the window glass), for example, is capable of electrically switching a transmissive state in which light is transmitted, and a non-transmissive state in which light is not transmitted (alternatively, light is blocked), and in the non-transmissive state, the projection image of the projector can be displayed. Alternatively, each of the side windows 103 to 106 (alternatively, a part of the side window) is constantly in the non-transmissive state, but may be in the transmissive state by opening the window. Alternatively, each of the side windows 103 to 106 (alternatively, a part of the side window) is constantly in the non-transmissive state, but the window may be in the transmissive state on appearance by displaying a live surrounding video imaged by a vehicle-mounted camera in the frame of the window (for example, setting "video see-through"). Furthermore, similarly, the sliding roof may be in the transmissive state and the non-transmissive state by using any method described above.

In a case where all of the windows 101 to 106 provided in the vehicle interior 100 are in the non-transmissive state, and the celestial sphere video is displayed on the entire inner wall surface of the vehicle interior 100 without a break, the passenger therein is capable of being deeply immersed in the video. That is, it is possible to construct a virtual space with a sense of immersion by displaying the celestial sphere video in an enclosed space such as the vehicle interior 100. For example, in a case where the vehicle performs the automated driving, the celestial sphere video may be displayed by using the entire inner wall surface of the vehicle interior 100, including the front glass.

Various videos are displayed on the inner wall surface of the vehicle interior 100. For example, commercial contents such as a movie may be displayed, a video imaged by a vehicle-mounted camera provided in the vehicle, a video imaged by a moving camera provided in a vehicle or a flight vehicle (such as a drone) other than the own vehicle, and a video imaged by fixed point camera fixed to an arbitrary location may be displayed. In addition, the imaged video may be a live video or an archive video. Alternatively, the video displayed on the inner wall surface of the vehicle interior 100, is not limited to the live-action video, and may be a video reproduced by a computer graphics (CG) technology.

For example, a video imaging a living room at home or a favorite location of the passenger (a cafe terrace that the passenger frequently uses, a park that the passenger frequently visits, a library that the passenger frequently uses, and the like) may be displayed on the inner wall surface of the vehicle interior 100, and thus, there is a case where a comfortable virtual space can be constructed, in which the passenger can be relaxed. The virtual space is constructed in the vehicle interior 100, in which the passenger can be relaxed, and thus, for example, even in a situation where the vehicle is caught in a clog or a traffic restriction, a sense of discomfort is not imparted to the passenger. For example, in a case where the vehicle performs the automated driving, the celestial sphere video may be displayed by using the entire inner wall surface of the vehicle interior 100, including the front glass, and all of the passengers including the driver, can be immersed in the virtual space.

In addition, there are various methods of acquiring the video contents to be displayed on the inner wall surface of the vehicle interior 100 by the vehicle. For example, the video contents may be stored in advance in a recording device which is mounted on the vehicle, or a portable medium in which the video contents is recorded (a Blu-ray disk or the like), may be brought in the vehicle interior 100, and thus, the video contents may be reproduced. Alternatively, a video subjected to streaming delivery from an external device such as a video server, for example, may be received through vehicle to X (V2X) communication (vehicle-to-vehicle communication and road-to-vehicle communication) or the like.

Which celestial sphere video to be displayed in the vehicle interior 100, may be designated through manual input, voice instruction, or the like, by the passenger, or may be automatically selected on the vehicle (a system) side. Alternatively, the video contents may be designated from the outside to the vehicle through the V2X communication or the like.

The vehicle interior becomes a space in which the passenger can be relaxed, in a case of matching the hobby or the taste of the passenger, but there is a concern that the passenger is not capable of being relaxed, but suffers discomfort in a case of not matching the hobby or the taste of the passenger.

Therefore, herein, a technology of automatically selecting a video of a location matching the hobby or the taste of the passenger, and of displaying the video in the vehicle interior is disclosed. In a case it is possible to automatically construct a virtual space matching the hobby or the taste of the passenger in the vehicle interior, the quality of user experience (UX) is improved. In addition, as described later, the production of the virtual space is adaptively controlled by switching a display method of the video, an agent image superimposed on the video, or the like, according to a driving situation of the vehicle or information of the passenger, and thus, it is possible to construct a virtual space unique to a mobile object.

Figure 2:
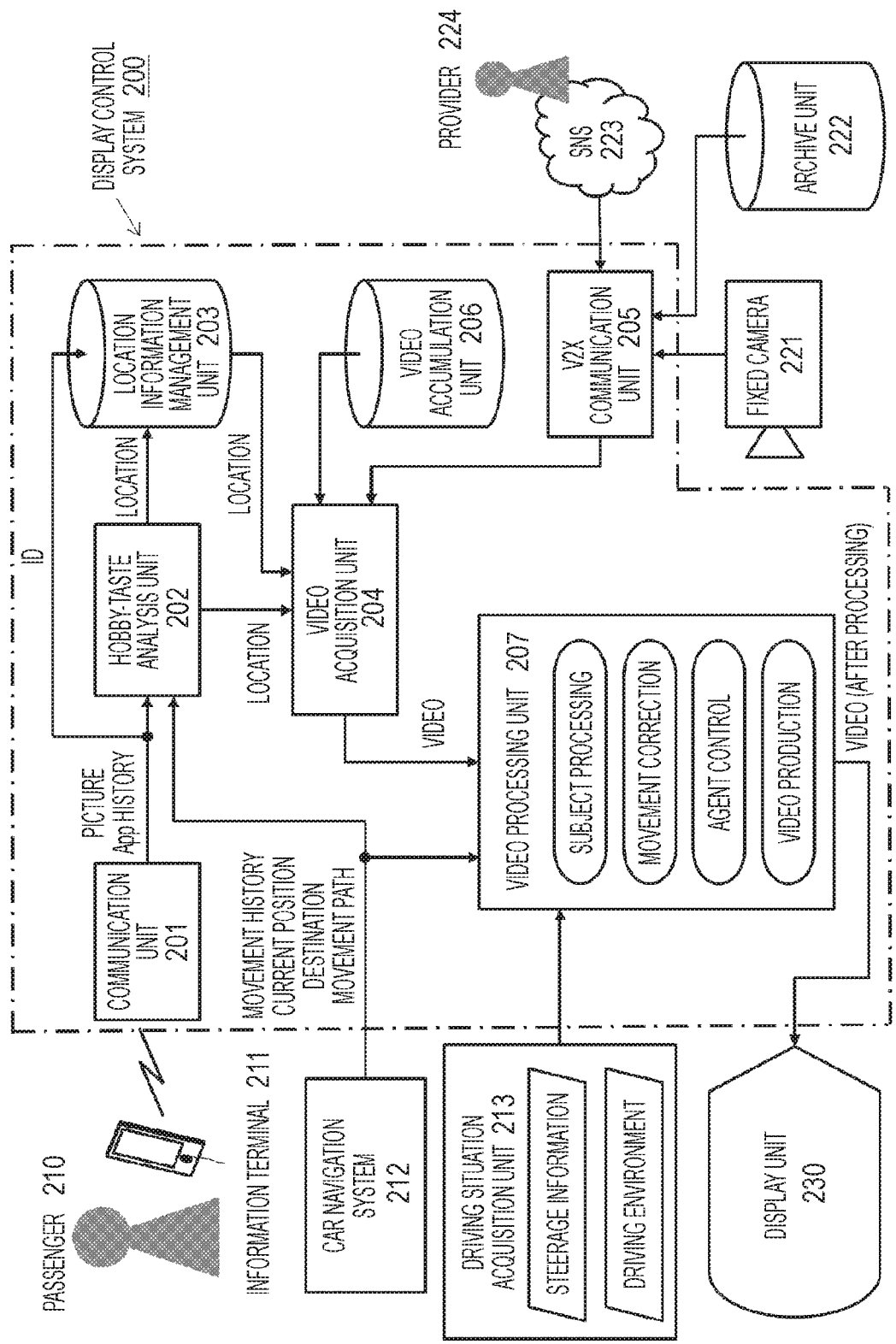
FIG. 2 is a diagram schematically illustrating a functional configuration of a display control system 200.

In FIG. 2, in a display unit setting the entire inner wall surface of the vehicle interior 100 to a display screen, as illustrated in FIG. 1, a functional configuration of a display control system 200 for automatically selecting the video of the location matching the hobby or the taste of the passenger is schematically illustrated. The display control system 200 which is illustrated, includes a communication unit 201, a hobby•taste analysis unit 202, a video acquisition unit 204, and a V2X communication unit, and controls the display of the video of the location matching the hobby or the taste of the passenger, in the vehicle interior. Furthermore, the display system 200 may include a location information management unit 203, a video accumulation unit 206, and a video processing unit 207, as an option.

The communication unit 201 is capable of communicating with an information terminal 211 such as a smart phone or a tablet, which is possessed by a passenger 210, through in-vehicle radio communication such as Bluetooth (Registered Trademark), proximity communication such as near field communication (NFC), a universal serial bus (USB) cable, or the like. In this embodiment, the communication unit 201 acquires processing history of a picture or an application from the information terminal 211, as the passenger information of the passenger 210, and outputs the processing history to the hobby•taste analysis unit 202. Using history of a map application and the like, using history of electronic money, or the like can be exemplified as the processing history of the application.

Furthermore, the communication unit 201 may read ID information which is capable of specifying the individual passenger 210, from the information terminal 211. Here, a method of specifying the passenger 210 is not limited. For example, face recognition processing may be performed with respect to an image obtained by imaging the vehicle interior with a vehicle-mounted camera such as a driver monitor camera, and thus, the passenger 210 may be specified. Individual certification may be performed by collecting biological information such as a fingerprint or an iris of the passenger 210.

The car navigation system 212 is a device which performs route guidance to the current position or the destination at the time of driving, and is normally mounted on the vehicle. In this embodiment, the car navigation system 212 outputs information such as the past movement history of the vehicle, the current position of the vehicle, the destination, and a movement path to the destination, to the hobby•taste analysis unit 202, as the passenger information. Furthermore, when the past movement history of the vehicle is output as the passenger information, the movement history may be filtered such that only the movement history when the current passenger 210 is on board, is obtained.

The hobby•taste analysis unit 202 analyzes the hobby or the taste of the passenger 210, on the basis of the passenger information obtained from the communication unit 201 or the car navigation system 212, specifies the location matching the hobby or the taste of the passenger 210 or the favorite location of the passenger 210, and outputs the location to the video acquisition unit 204.

The hobby•taste analysis unit 202 combines any one or two or more of a picture taken by the passenger 210 in the past, using history of an application, movement history of the passenger or the vehicle, and the like, and analyzes the hobby or the taste of the passenger 210. The location matching the hobby or the taste of the passenger 210 or the favorite location of the passenger 210, for example, is the cafe terrace that the passenger 210 frequently uses, the park that the passenger 210 frequently visits, the library that the passenger frequently uses, and the like. A location where a plurality of pictures is taken, a location searched in the past, a location where the passenger or the vehicle frequently visits, or the like is specified as the location matching the hobby or the taste of the passenger 210.

Furthermore, the location information management unit 203 may manage the location of the passenger 210 in a database, in association with an ID of the passenger 210 obtained on the basis of the information read out from the information terminal 211. Hereinafter, when the same passenger 210 is on the vehicle, the location associated with the ID may be read out from the location information management unit 203, without analyzing again the hobby or the taste, and thus, may be output to the video acquisition unit 204.

The video acquisition unit 204 performs processing for acquiring the video of the location matching the hobby or the taste of the passenger 210, specified by the hobby•taste analysis unit 202.

The video acquisition unit 204, for example, acquires the video of the location matching the hobby or the taste from the outside of the car, through the V2X communication of the V2X communication unit 205. It is assumed that a fixed camera 221 is provided in the location, and a live video stream which is delivered by being taken with the fixed camera 221, is received by the V2X communication unit 205, as an example. Furthermore, the fixed camera may be provided in shops or facilities contracted in advance, such that a service for issuing a coupon usable in the shops or the facilities is performed according to the total number of times or a frequency of delivering the live video.

Here, the video acquired by the video acquisition unit 204 is not necessarily limited to the live video. For example, an archived video which was taken in the past, but not the live video currently taken by the fixed camera 221, may be acquired from an archive unit 222 (for example, a stream server or the like). For example, in a case where the live video of the location matching the hobby or the taste of the passenger 210 is currently hardly seen due to the adverse weather condition, and thus, the passenger 210 suffers discomfort without being relaxed even in a case of watching the live video, the archive video which was taken in a good condition in the past, may be acquired from the archive unit 222.

In addition, in a case where the fixed camera is not provided in the location specified by the hobby•taste analysis unit 202, and the archive video is not capable of being acquired, the video acquisition unit 204 may recruit a provider 224 of the video of the location on a social network service (SNS) 223 through the V2X communication unit 205, and may receive the video stream taken by the provider 224 with a smart phone or the like. Alternatively, the effect that the video is not capable of being acquired, may be fed back to the hobby•taste analysis unit 202 without recruiting the provider 224 of the video, and the next candidate of the location may be output.

In addition, the video acquisition unit 204 may reproduce the video of the location by a CG technology, but not the live-action video of the location specified by the hobby•taste analysis unit 202. Alternatively, a CG video reproduced on the outside may be received through the V2X communication unit 205 without reproducing the CG video in the display control system 200.

In addition, the video acquisition unit 204 may reproduce and output the corresponding video of the location from the video accumulation unit 206 provided in the vehicle, without acquiring the video from the outside of the car through the V2X communication of the V2X communication unit 205. The video accumulation unit 206, for example, is configured as a reproduction device reproducing a video from a mounted recording medium such as a hard disk drive, Blu-ray, or a digital versatile disc (DVD).

The video acquired by the video acquisition unit 204, is displayed in the vehicle interior by the display unit 230. Thus, a virtual space matching the hobby or the taste of the passenger is automatically constructed in the vehicle interior, and thus, the quality of UX is improved.

The display unit 230, for example, as illustrated in FIG. 1, uses the inner wall surface of the vehicle interior as the celestial sphere display. Alternatively, the display unit 230 may be a flat display such as an LCD, or may be a flexible display such as an OLED, but not a projection type display. In addition, the display unit 230 is not limited to the celestial sphere display, and three surfaces excluding front glass, only the front glass, or only the ceiling may be set to the screen.

Furthermore, predetermined processing may be performed by the video processing unit 207, and then, the live-action video may be displayed and output from the display unit 230, as an option, without directly displaying and outputting the live-action video acquired by the video acquisition unit 204, with respect to the display unit 230.

The video processing unit 207 may use information such as the movement history, the current position, the destination, the movement path, and the like, input from the car navigation system 212, in order to perform processing with respect to the video of the location matching the hobby or the taste of the passenger 210. In addition, the video processing unit 207 may acquire information associated with the driving situation such as steerage information or driving environment, from the driving situation acquisition unit 213, and may use the information in the video processing. The steerage information, for example, includes a movement rate or an acceleration rate, a steering angle, or the like of the vehicle. In addition, the driving environment includes an indoor environment such as the number of passengers, and the surrounding environment of the vehicle (a temperature or humidity, a climate, a road surface situation, road traffic information, or the like).

The driving situation acquisition unit 213, for example, is configured of meters and gauges, or sensors, which are provided in the vehicle. In addition, the information associated with the surrounding environment of the vehicle, may be acquired from the outside through the V2X communication unit 205. For example, the road traffic information such as a clog or a traffic restriction, can be acquired from an information communication system such as a vehicle information and communication system (VICS: Registered Trademark), through the V2X communication unit 205.

(1) to (4) described below can be exemplified as the processing performed by the video processing unit 207.

(1) Subject Processing
(2) Movement Correction
(3) Agent Control
(4) Video Production
(1) Subject Processing An example of the subject processing is processing for protecting the privacy of a subject included in the video at the time of displaying the live-action video such as the live video. In a case of taking a picture with the fixed camera provided in a public space such as the cafe terrace, the park, or the library, there is a possibility that various people are shot, and it is an unrealistic operation to get a permission for shooting from all of the people, and there may be a person who does not want his video to be arbitrarily used.

For example, it is possible to extract the subject included in the video on the basis of a feature amount such as a movement vector or an edge. In a case where it is necessary to protect the privacy of the extracted subject, modulation processing of deleting the subject from the video, such as mosaic or airbrushing, is performed, and video processing of superimposing a video of a character, an agent, UI, or the like thereon. In addition, in a case where the movement of the subject is fast, and processing such as the deletion, the mosaic, or the superimposition of the other image, is not capable of catching up the movement, the other image may be superimposed on the entire video. In addition, in a case where it is necessary to protect the privacy not only on the video of the subject but also on the sound, similarly, processing of deleting the sound of the subject or applying modulation, is performed together.

Processing of correcting the expression of the subject included in the video, can be exemplified as another example of the subject processing. For example, in a case where a subject with sullen expression or angry expression is seen, the passenger 210 watching the expression is not capable of being relaxed, and thus, image synthesis is performed such that good expression such as a smiley face is obtained.

When the live video is displayed, it is necessary to execute the subject processing in real time. In the archive video, a video not including a subject which is required to be subjected to the processing, may be archived in the archive unit 222, or a video which is subjected to the subject processing in advance, may be archived in the archive unit 222.

(2) Movement Correction

The movement correction is processing of preventing carsickness of the passenger 210 watching the video of which the movement is fast. For example, the movement of the video is detected on the basis of the feature amount such as the movement vector. The video processing unit 207 may perform the movement correction by electronic processing in which the video is read in a frame memory (not illustrated) once, the position is shifted such that the movement is cancelled, and the video is read out from the frame memory. In addition, in a case where the movement exceeds a predetermined value, the live video is switched to a still image, and thus, the carsickness is prevented. The still image may be a still image taken by the fixed camera 221, or a video of the live video which is temporarily paused, or may be a still image completely different from the taken image of the specified location. In a case where the movement of the live video decreases to be less than the predetermined value after being changed to the still image, the live video may be displayed again.

When the live video is displayed, it is necessary to execute the movement correction processing in real time. In the archive video, a video which is required to be subjected to the movement correction processing, may not be originally archived, or a video which is subjected to the movement correction processing in advance, may be archived in the archive unit 222.

(3) Agent Control

Figure 3:
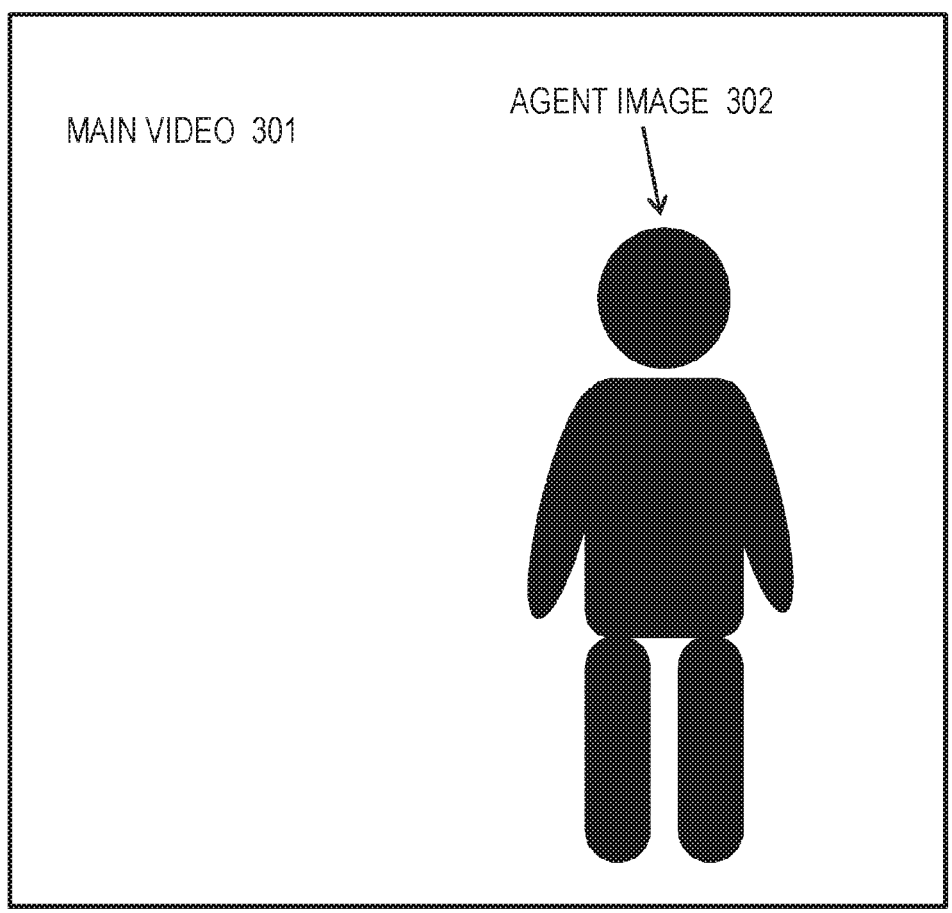
FIG. 3 is a diagram illustrating an aspect in which an agent image 302 is superimposed on a main video 301.

The agent control is processing of superimposing an image of an agent, a character, or the like on the live-action video (or the CG video) displayed on the display unit 230, or processing of switching the image of the agent. In FIG. 3, an aspect is illustrated in which an agent image 302 is superimposed on a main video 301 such as the live-action video or the CG video. For example, the display of the agent is dynamically and adaptively controlled on the basis of the current position or the destination, the movement history, and the driving situation of the vehicle, and thus, the control of the agent unique to the mobile object is realized, and the quality of UX is improved.

For example, the type or the movement of the agent image is switched, according to the movement rate or the acceleration rate of the vehicle. For example, the operation of the agent is sequentially switched to be Stop→Walk→Run, as the speed of the vehicle increases from 0 km/h (being stopped). At this time, a limb movement of the agent may be set to be gradually faster, or the operation of the agent may be discontinuously switched whenever the speed of the vehicle exceeds a certain threshold value.

In addition, a display color of the agent may be switched according to the movement rate or the acceleration rate of the vehicle, or the thickness of the same display color may be changed according to the movement rate or the acceleration rate (for example, becoming thicker as the movement rate increases).

In addition, the expression of the agent may be changed, or a predetermined operation may be performed, according to the movement rate of the vehicle. For example, in a case where the vehicle exceeds a legal speed, the expression of the agent is switched to angry expression, or a sound message of urging a decrease in the speed, may be generated.

Furthermore, in a case where the display of the agent is frequently switched, the passenger 210 watching the video may feel that the agent is bothersome, and there is a concern that the passenger 210 feels a sense of discomfort without being relaxed. For example, in a case where the vehicle is driven around the legal speed, as a guide, and the display of the agent is switched whenever the speed is higher or lower than the legal speed, it is annoying to watch the video. Therefore, the display switching of the agent may have hysteresis characteristics. For example, it is possible for the display switching of the agent to have hysteresis characteristics, by setting threshold values different at the time of acceleration and at the time of deceleration (a threshold value at the time of the acceleration is set to be greater than a threshold value at the time of the deceleration). Alternatively, in a case where the agent image is switched once, the switching may not performed for a certain period regardless of a change in the movement rate.

In FIG. 7, an example of the agent control having the hysteresis characteristics is illustrated. In a graph which is illustrated, a horizontal axis is set to a time axis, and a vertical axis is set to the movement rate of the vehicle. Then, the threshold value at the time of the acceleration is set to V1, and the threshold value at the time of the deceleration is set to V2 (here, V1>V2). Then, the movement rate of the vehicle is accelerated once, and then, is decelerated, along a curve represented by a reference numeral of 701. The movement rate of the vehicle at a time point P represented by a reference numeral of 702, exceeds a threshold value V1 at the time of the acceleration, and thus, the image of the agent to be displayed in the vehicle interior, is switched from an image represented by a reference numeral of 711 to an image represented by a reference numeral of 712. After that, the vehicle is started to be decelerated, and the movement rate of the vehicle at a time point Q1 represented by a reference numeral of 703, is lower than a threshold value V1 at the time of the acceleration, but the image of the agent is not switched. After that, in a case where the vehicle is further decelerated, and the movement rate of the vehicle at a time point Q2 represented by a reference numeral of 704, is lower than a threshold value V2 at the time of the deceleration, the image of the agent is switched from the image represented by the reference numeral of 712 and to the image represented by the reference numeral of 713.

In addition, the image of the agent may be switched in each movement region of the vehicle. For example, a region where the vehicle is current driven (prefectural and city governments or the like) may be specified on the basis of current position information and map information, obtained from the car navigation system 212, and the image of the agent may be switched in each region.

For example, a unique character of the region may be used as the image of the agent (here, there is a case where it is necessary to properly obtain licensing of using the character). In addition, the image of the agent may be switched (alternatively, while the image of the agent is not switched), and the agent may speak using the regional dialect.

Furthermore, in a case where the vehicle is driven on a movement path of frequently passing through a boundary between regions, and the display of the agent is frequently switched, the passenger 210 watching the video feels that the agent is bothersome, and there is a concern that the passenger 210 feels a sense of discomfort without being relaxed. Therefore, in a case where the agent image is switched once, the agent image may not be switched for a certain period even though the vehicle passes through the boundary between the regions.

In addition, the image of the agent may be switched according to the movement path. For example, when the vehicle passes through a tourist spot or is close to the destination, the image of the agent in a good mood is displayed. In addition, when the vehicle is driven in the vicinity of the sea, the agent may be in the swimsuit.

In addition, the image display of the agent may be controlled according to an indoor situation. For example, it is possible to grasp or assume the indoor situation, on the basis of the image of the vehicle-mounted camera shooting the inside, such as a driver monitor camera. The shooting of the vehicle-mounted camera may be started with the door of the vehicle being opened, as a trigger. It is possible to identify the number of passengers, and the gender, the age, the expression of the passenger (alternatively, feeling or emotion), on the basis of the face recognition processing of the taken image. In a case where the agent is associated with the gender or the age, and the expression, in advance, it is possible to switch the image of the agent on the basis of an identification result. For example, when it is known that there is a young passenger (alternatively, when it is detected that a young passenger is bored in the car), an agent using a popular animation character may appear. A satisfaction level of the passenger at the time of displaying the image of the agent may be further measured on the basis of the face recognition or the like, and the association between the passenger and the agent may be sequential learned. In addition, a character to be used for the agent may be registered for each passenger, or the agent may be switched according to the manipulation of the passenger.

In addition, the image display of the agent may be controlled according to the surrounding environment of the vehicle. Here, the surrounding environment is a temperature or humidity, a climate, a road surface situation, road traffic information (a clog or a traffic restriction), and the like, and can be acquired from the driving situation acquisition unit 213. For example, when it rains, the image of the agent is switched to the image of the agent provided with an umbrella or a rain gear, and when it is cold, the image of the agent is switched to the image of the agent provided with protection against cold.

(4) Video Production

The video production is processing for increasing a production effect of a virtual space by mainly processing the live-action video. Obviously, the video production may also be applied to the CG video generated in advance. The video processing unit 207 applies the production effect according to the driving situation such as the steerage information or the driving environment, to the video displayed in the vehicle interior, and thus, it is possible to construct the virtual space unique to the mobile object.

For example, the video processing unit 207 applies the production effect according to the surrounding environment of the vehicle, such as the temperature or the humidity, the climate, the road surface situation, and the clog, to the video. Specifically, in a case where the vehicle is driven in the rain, the video may be switched to an archive video of the location matching the hobby or the taste of the passenger 210 when it rains, or a CG image of rain may be superimposed on the live video of the location (it does not rain). In addition, the tone or the hue of the display video may be changed according to the climate or a time zone (in particular, when there is a time difference between the current position of the vehicle and the video), without performing direct and short-sighted production, such as rain when it rains, and snow when it snows.

In addition, the video processing unit 207 may perform the video production on the basis of the information of the destination, but not the surrounding environment of the vehicle.

Figure 4:
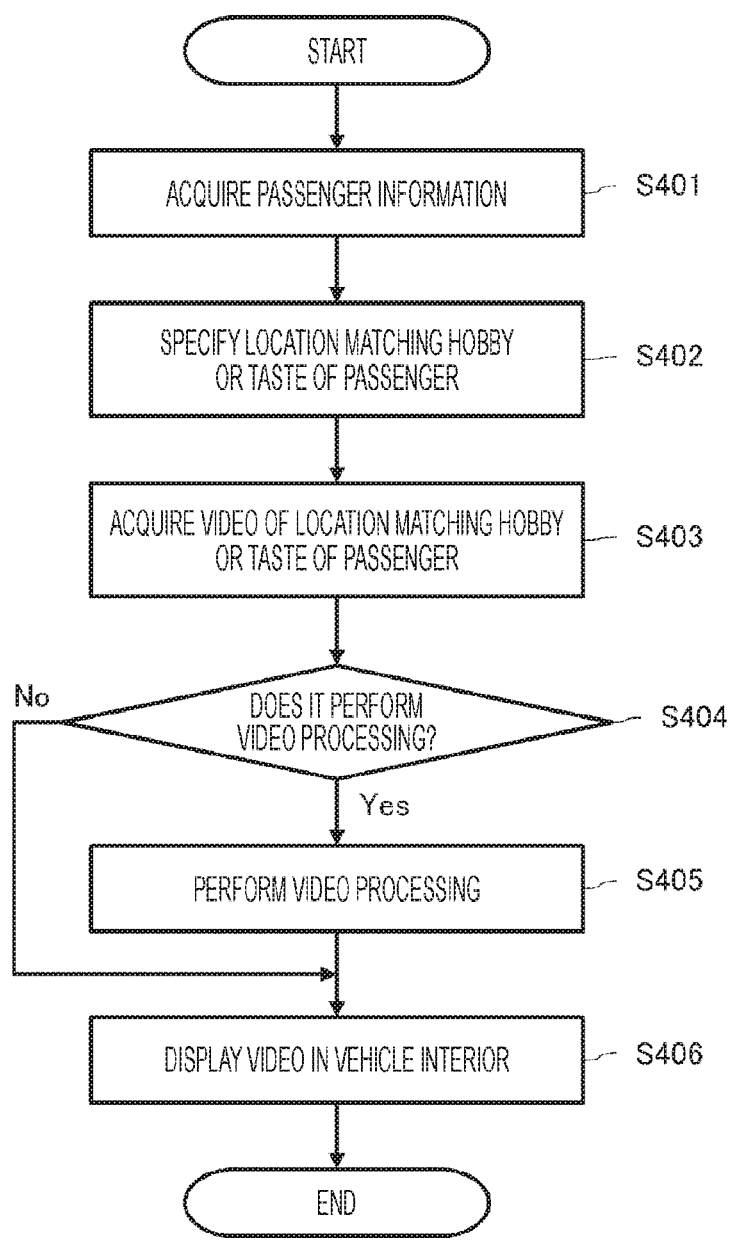
FIG. 4 is a flowchart illustrating schematic processing procedure for displaying a video in a vehicle interior 100 by the display control system 200 illustrated in FIG. 2.

In FIG. 4, a schematic processing procedure for displaying the video in the vehicle interior 100 by the display control system 200 illustrated in FIG. 2 is illustrated in a flowchart. The processing procedure, for example, is activated when the vehicle, which is a target, proceeds to an automated driving mode. Alternatively, the processing procedure may be activated according to the manipulation of the passenger, regardless of the driving mode of the vehicle.

First, the passenger information of the vehicle is acquired (Step S401). For example, the communication unit 201 acquires the picture or the processing history of the application from the information terminal 211 of a smart phone, a tablet, or the like, which is possessed by the passenger 210, through in-vehicle radio communication or a cable, as the passenger information of the passenger 210. In addition, information such as the past movement history of the vehicle, the current position of the vehicle, the destination, and the movement path to the destination, is acquired from the car navigation system 212, as the passenger information.

Next, the hobby•taste analysis unit 202 analyzes the hobby or the taste of the passenger 210, on the basis of the passenger information obtained from the communication unit 201 or the car navigation system 212, and specifies the location matching the hobby or the taste of the passenger 210 or the favorite location of the passenger 210 (Step S402).

The hobby•taste analysis unit 202 analyzes the hobby or the taste of the passenger 210 by combining any one or two or more of the picture taken by the passenger 210 in the past, the using history of the map application in the information terminal 211, the movement history of the passenger or the vehicle, and the like. The location matching the hobby or the taste of the passenger 210 or the favorite location of the passenger 210, for example, are the cafe terrace that the passenger 210 frequently uses, the park that the passenger 210 frequently visits, the library that the passenger frequently uses, and the like. A location where a plurality of pictures is taken, a location searched in the past, a location where the passenger or the vehicle frequently visits, or the like is specified as the location matching the hobby or the taste of the passenger 210.

Then, the video acquisition unit 204 performs processing for acquiring the video of the location matching the hobby or the taste of the passenger 210, which is specified by the hobby•taste analysis unit 202 (Step S403).

A method of acquiring the video is arbitrary. The video acquisition unit 204, for example, acquires the video of the location matching the hobby or the taste from the outside of the car, through the V2X communication of the V2X communication unit 205. It is assumed that the fixed camera 221 is provided in the location, and the live video stream which is delivered by being taken with the fixed camera 221, is received by the V2X communication unit 205, as an example. Furthermore, the fixed camera may be provided in the shops or the facilities contracted in advance, such that a service for issuing a coupon usable in the shops or the facilities is performed according to the total number of times or the frequency of delivering the live video.

In addition, the video acquisition unit 204 may acquire the archived video which was taken in the past, but not the live video currently taken by the fixed camera 221, from the archive unit 222 (for example, the stream server or the like). Further, the archived video which was taken in the past, but not the live video currently taken by the fixed camera 221, may be acquired from the archive unit 222 (for example, the stream server or the like). Alternatively, the video acquisition unit 204 may reproduce and output the corresponding video of the location from the video accumulation unit 206 provided in the vehicle.

Next, video processing unit 207 performs processing with respect to the live-action video acquired by the video acquisition unit 204 (Step S405), as optional processing (Yes of Step S404).

The video processing unit 207 performs the subject processing for protecting the privacy of the subject at the time of displaying the live-action video such as the live video, the movement correction for preventing the carsickness when the movement of the video is fast, the agent control of dynamically and adaptively controlling the display of the agent on the basis of the current position or the destination of the vehicle, the movement history, and the driving situation, the video production according to the driving situation such as the steerage information or the driving environment, and the like.

Then, the video acquired by the video acquisition unit 204, or the video subjected to the processing by the video processing unit 207, is displayed in the vehicle interior by the display unit 230 (Step S406). The virtual space matching the hobby or the taste of the passenger is automatically constructed in the vehicle interior, and thus, the quality of UX is improved.

The display unit 230, for example, as illustrated in FIG. 1, is configured such that the inner wall surface of the vehicle interior is used as the celestial sphere display. Alternatively, the display unit 230 may be a flat display such as an LCD, or may be a flexible display such as an OLED, but not a projection type display. In addition, the display unit 230 is not limited to the celestial sphere display, and three surfaces excluding front glass, only the front glass, or only the ceiling may be set to the screen.

Figure 5:
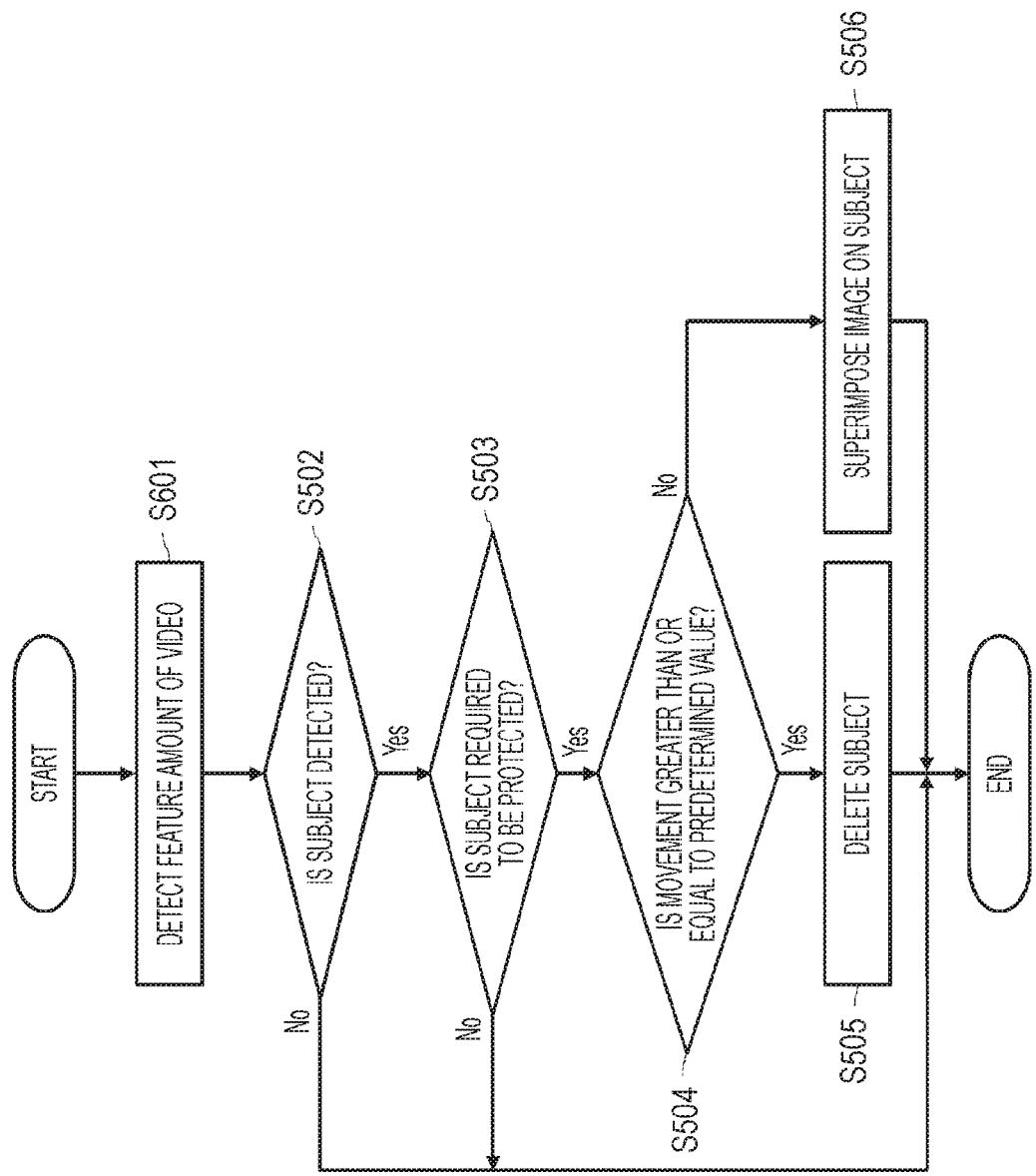
FIG. 5 is a flowchart illustrating an example of subject processing.

In FIG. 5, an example of the subject processing, which is performed in Step S405 of the flowchart illustrated in FIG. 4, is illustrated in a flowchart.

First, the subject included in the video is tried to be extracted on the basis of the feature amount such as the movement vector or the edge (Step S501).

Next, it is checked that the subject can be detected from the video (Step S502). In a case where the subject is not detected (No of Step S502), there is no processing target, and thus, this processing routine is ended.

On the other hand, in a case where the subject is detected (Yes of Step S502), it is checked whether or not to protect the subject (Step S503). For example, the subject may be recognized as an image, and it may be checked whether or not to protect the subject on the basis of attribution information (the age, the gender, individual information, and the like).

For example, in a case where the subject turns back, and thus, it is not necessary to protect the subject, or in a case where licensing such as image right is obtained in advance from the subject, or it is not necessary to obtain the licensing from the subject since the subject is an animal (No of Step S503), it is not necessary to perform the processing, and thus, this processing routine is ended.

In a case where it is necessary to protect the subject (Yes of Step S503), a moving speed of the subject is further checked (Step S504).

When the movement of the subject is slower than a predetermined speed (Yes of Step S504), processing of deleting the subject from the video is performed (Step S505). In addition, when the movement of the subject exceeds the predetermined speed (No of Step S504), and thus, the processing is not capable of being performed in time, processing of applying a mosaic to the subject, of superimposing the image of the character or the agent on the subject, or of superimposing the UI image on the subject, is performed (Step S506).

In FIG. 6, an example of the movement correction processing, which is performed in Step S405 of the flowchart illustrated in FIG. 4, is illustrated in a flowchart.

First, the movement of the video is detected on the basis of the feature amount such as the movement vector (Step S601).

Next, in order to prevent the carsickness of the passenger watching the video, it is checked whether or not it is necessary to correct the movement of the video (Step S602). Here, in a case where it is not necessary to correct the movement of the video correction (No of Step S602), this processing routine is ended.

On the other hand, in a case where it is necessary to correct the movement of the video in order to prevent the carsickness of the passenger watching the video (Yes of Step S602), it is checked whether or not the detected movement of the video is less than or equal to a predetermined value (Step S603).

In a case where the movement of the video is less than or equal to the predetermined value (Yes of Step S603), the movement correction is performed according to the electronic processing in which the position is shifted such that the movement is cancelled, and thus, the video is read out from the frame memory (Step S604).

In addition, in a case where the movement of the video exceeds the predetermined value (No of Step S603), the movement correction according to the electronic processing is abandoned, the video is switched to the still image, and the carsickness is prevented (Step S605). The still image may be a still image taken by the fixed camera 221, or a video of the live video which is temporarily paused, or may be a still image completely different from the taken image of the specified location. Furthermore, in a case where the movement of the live video decreases to be less than the predetermined value after being changed to the still image, the live video may be displayed again.

INDUSTRIAL APPLICABILITY

As described above, the technology disclosed herein has been described in detail, with reference to the specified embodiment. However, it is obvious that the modification or the substitution of the embodiment can be performed by a person skilled in the art, within a range not departing from the gist of the technology disclosed herein.

The technology disclosed herein can be applied to various vehicles such as an automobile (including a gasoline vehicle and a diesel vehicle), an electric automobile, a hybrid electric automobile, a motorcycle, a bicycle, and a personal mobility. Further, the technology disclosed herein can also be applied to a mobile object (a robot, an airplane, a ship, and the like) in a form other than a vehicle to be driven on a road.

In short, the technology disclosed herein has been described in the form of exemplification, and the contents described herein should not be interpreted restrictively. In order to judge the gist of the technology disclosed herein, the claims should be taken into consideration.

Note that the technology disclosed in the present specification can adopt the following configurations.

(1) A display control device, including:
an acquisition unit configured to acquire passenger information of a mobile object;
a specification unit configured to specify a location suitable for a hobby or a taste of a passenger on the basis of the passenger information; and
a control unit configured to control a video displayed in the mobile object on the basis of the specified location.

(2) The display control device according to (1),
in which the acquisition unit acquires the passenger information from an information terminal used by the passenger.

(3) The display control device according to (2),
in which the acquisition unit acquires at least one of an image accumulated in the information terminal or history information of processing of a map application or the like to be executed by the information terminal, as the passenger information, and the specification unit specifies the location on the basis of an analysis result of the image or the history information.

(4) The display control device according to (2),
in which the acquisition unit acquires history information that the passenger is moved by the mobile object, and the specification unit specifies the location on the basis of the history information.

(5) The display control device according to (1),
in which the control unit displays a video of the location matching a hobby or a taste of the passenger, such as a cafe terrace that a passenger frequently uses, a park that the passenger frequently visits, and a library that the passenger frequently uses, in the mobile object.

(6) The display control device according to (1),
in which the control unit displays a live-action video including a live video or an archive video of the location, in the mobile object (in a case where a fixed camera is provided in the specified location, a live streaming video is displayed. In addition, in a case where the fixed camera is not provided, a provider of a video may be recruited on a social network, and the video taken by the provider with a smart phone or the like, may be streamed).

(7) The display control device according to (1),
in which the control unit displays a CG video in which the location is reproduced, in the mobile object.

(8) The display control device according to any one of (5) to (7),
in which the control unit controls display of a subject included in the video.

(9) The display control device according to (8),
in which the control unit extracts the subject on the basis of a feature amount of a movement vector or an edge of the video.

(10) The display control device according to (8),
in which the control unit controls display of the subject on the basis of attribution information of the subject, such as the necessity of protecting privacy.

(11) The display control device according to (8),
in which the control unit performs predetermined image processing of deleting the subject of which the privacy is required to be protected, from the video, of applying a mosaic to the subject, and of superimposing an image of a character or an agent, UI, or the like, on the subject.

(12) The display control device according to (1),
in which the control unit controls display of the video, according to a feature amount such as a movement vector of the video.

(13) The display control device according to (12),
in which when a movement of the video is fast, the control unit displays a still image by replacing the video with the still image, or displays the video after being subjected to stabilization processing of suppressing the movement, and thus, prevents carsickness of the passenger watching the video.

(14) The display control device according to (1),
in which the control unit further controls display of an agent image superimposed on the video.

(15) The display control device according to (14),
in which the control unit controls display of the agent according to a driving situation of the mobile object, such as a movement rate or an acceleration rate of a vehicle, a movement region in which the vehicle is current driven, and movement history (alternatively, the hobby or the taste of the passenger predicted from the movement history).

(16) The display control device according to (14),
in which the control unit controls the display of the agent according to the passenger information (specified passenger information and the number of passengers).

(17) The display control device according to (1),
in which the control unit further controls display of the video according to a driving situation of the mobile object, such as information of an outdoor environment, a climate (a temperature or humidity, a weather, or the like, on the outside of the car), a destination or a movement path, and the like.

(18) A display control method, including:
an acquisition step of acquiring passenger information of a mobile object;
a specification step of specifying a location suitable for a hobby or a taste of a passenger on the basis of the passenger information;
and a control step of controlling a video displayed in the mobile object on the basis of the specified location.

(19) A display device, including:
a display unit configured to display a video in a mobile object;
an acquisition unit configured to acquire passenger information of the mobile object;
a specification unit configured to specify a location suitable for a hobby or a taste of a passenger on the basis of the passenger information; and
a control unit configured to control the video displayed by the display unit on the basis of the specified location.

(20) A mobile device, including:
a mobile object;
a display unit configured to display a video in the mobile object;
an acquisition unit configured to acquire passenger information of the mobile object;
a specification unit configured to specify a location suitable for a hobby or a taste of a passenger on the basis of the passenger information; and a control unit configured to control the video displayed by the display unit on the basis of the specified location.

REFERENCE SIGNS LIST

200 Display control system
201 Communication unit
202 Hobby taste analysis unit
203 Location information management unit
204 Video acquisition unit
205 V2X communication unit
206 Video accumulation unit
207 Video processing unit
211 Information terminal
212 Car navigation system
213 Driving situation acquisition unit
221 Fixed camera
222 Archive unit
223 SNS
230 Display unit

The invention claimed is:

1. A display control device, comprising:
circuitry configured to:
acquire passenger information associated with a passenger of a mobile object;
determine a location based on the passenger information, wherein the determined location is associated with a hobby of the passenger;
control a display device to display a video in the mobile object based on the determined location;
control superimposition of a first agent image, on the displayed video, based on the determined location;
determine a movement rate of the mobile object that exceeds a first threshold value; and
switch display of the superimposed first agent image to a display of a second agent image based on the determination that the movement rate of the mobile object exceeds the first threshold value.

2. The display control device according to claim 1, wherein the circuitry is further configured to acquire the passenger information from an information terminal of the passenger.

3. The display control device according to claim 2, wherein the circuitry is further configured to:
acquire, as the passenger information, at least one of a specific image from the information terminal or processing history information of the information terminal; and
determine the location based on an analysis result of the acquired at least one of the specific image or the processing history information.

4. The display control device according to claim 2, wherein the circuitry is further configured to:
acquire history information indicating that movement of the passenger is by the mobile object; and
determine the location based on the acquired history information.

5. The display control device according to claim 1, wherein the displayed video is of the determined location.

6. The display control device according to claim 1, wherein the circuitry is further configured to control the display device to display a live-action video, including one of a live video of the determined location or an archive video of the determined location, in the mobile object.

7. The display control device according to claim 1, wherein the circuitry is further configured to control the display device to display a computer graphics (CG) video, of the determined location, in the mobile object.

8. The display control device according to claim 5, wherein the circuitry is further configured to control the display device to display a subject in the displayed video.

9. The display control device according to claim 8, wherein the circuitry is further configured to extract subject information of the subject based on a feature amount of at least one of a movement vector or an edge of the displayed video.

10. The display control device according to claim 8, wherein the circuitry is further configured to control the display device to display the subject based on attribution information of the subject.

11. The display control device according to claim 8, wherein the circuitry is further configured to delete the subject from the displayed video.

12. The display control device according to claim 1, wherein the circuitry is further configured to control the display device to display the video based on a feature amount of the video.

13. The display control device according to claim 12, wherein the circuitry is further configured to control the display device to one of:
execute a stabilization process on the displayed video to suppress movement of the displayed video, wherein the stabilization process is executed based on the movement of the displayed video that exceeds a second threshold value, and
display the video after the execution of the stabilization process, or
switch the display of the video with a display of a still image, wherein the display of the video is switched with the display of the still image based on the movement of the displayed video that exceeds the second threshold value.

14. The display control device according to claim 1, wherein the circuitry is further configured to control the display device, to display the second agent image, based on at least one of an acceleration rate of the mobile object, a movement region of the mobile object, or movement history of the mobile object.

15. The display control device according to claim 1, wherein the circuitry is further configured to control the display device to display the second agent image based on a number of passengers in the mobile object.

16. The display control device according to claim 1, wherein the circuitry is further configured to control the display device to display the video based on at least one of information of an outdoor environment of the mobile object, information on climate outside the mobile object, information on temperature, information on humidity, information on weather, information on a destination of the mobile object, or a movement path of the mobile object.

17. A display control method, comprising:
acquiring passenger information associated with a passenger of a mobile object;
determining a location based on the passenger information, wherein the determined location is associated with a hobby of the passenger;
controlling a display device to display a video in the mobile object based on the determined location;
controlling superimposition of a first agent image, on the displayed video, based on the determined location;
determining a movement rate of the mobile object that exceeds a threshold value; and switching display of the superimposed first agent image to a display of a second agent image based on the determination that the movement rate of the mobile object exceeds the threshold value.

18. A display device, comprising:
circuitry configured to:
- control a display screen to display a video in a mobile object;
- acquire passenger information associated with a passenger of the mobile object;
- determine a location based on the passenger information, wherein the determined location is associated with a hobby of the passenger;
- control superimposition of a first agent image, on the displayed video, based on the determined location;
- determine a movement rate of the mobile object that exceeds a threshold value; and
- switch display of the superimposed first agent image to a display of a second agent image based on the determination that the movement rate of the mobile object exceeds the threshold value.

19. A mobile device, comprising:
a mobile object; and
circuitry configured to:
- control a display device to display a video in the mobile object;
- acquire passenger information associated with a passenger of the mobile object;
- determine a location based on the passenger information, wherein the determined location is associated with a hobby of the passenger;
- control superimposition of a first agent image, on the displayed video, based on the determined location;
- determine a movement rate of the mobile object that exceeds a threshold value; and
- switch display of the superimposed first agent image to a display of a second agent image based on the determination that the movement rate of the mobile object exceeds the threshold value.

* * * * *